March 6, 1956 — O. K. KELLEY — 2,737,061
3-PHASE TURBINE DRIVE
Filed Nov. 19, 1949 — 4 Sheets-Sheet 2

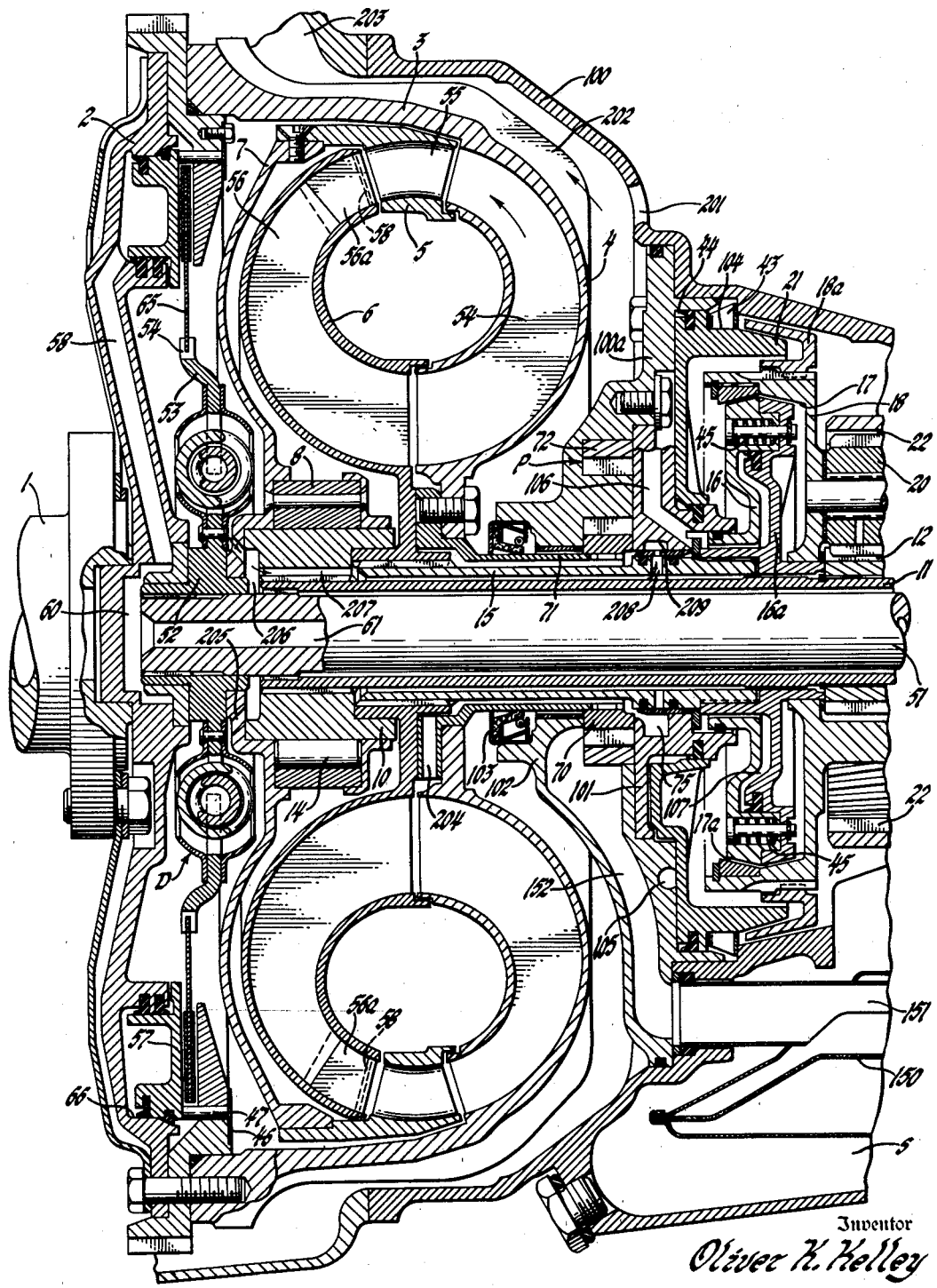

Inventor
Oliver K. Kelley
By Willets, Helwig & Gaillio
Attorneys

March 6, 1956 O. K. KELLEY 2,737,061
3-PHASE TURBINE DRIVE
Filed Nov. 19, 1949 4 Sheets-Sheet 3

Inventor
Oliver K. Kelley
By Willito, Helwig & Baillio
Attorneys

March 6, 1956 O. K. KELLEY 2,737,061
3-PHASE TURBINE DRIVE

Filed Nov. 19, 1949 4 Sheets-Sheet 4

Inventor
Oliver K. Kelley
By Willits, Helmig & Baillio
Attorneys

United States Patent Office 2,737,061
Patented Mar. 6, 1956

2,737,061

3-PHASE TURBINE DRIVE

Oliver K. Kelley, Birmingham, Mich., assignor to General Motors Corporation, Detroit, Mich., a corporation of Delaware Application November 19, 1949, Serial No. 128,278

58 Claims. (Cl. 74—677)

The present invention relates to variable ratio drive mechanism, particularly for vehicles, in which plural driven fluid turbine rotors are connected with plural gear train elements coupled to a driven shaft. The present invention provides overlapping reduction ranges of variable drive to a driven shaft, with automatic transition between said ranges obtained by inherent selective drive action of such driven rotors, and relates more particularly to such an arrangement of turbine rotor and gear elements in which torque is said to be divided among plural driven turbine rotors and is combined in a torque-multiplying gear train having controllable drive ratio-determining members, operable to establish at least two forward reduction drive conditions, and reverse.

The invention specifically embodies a fluid turbine device consisting of three rotors, one an impeller driven by the power source, and two torque-transmitting rotors, one of which is bladed to rotate at higher speeds than the impeller under initial drive conditions, and the other of which is bladed to rotate at lower speeds than the impeller during forward reduction drive following initial drive. The first of these rotors is geared to furnish a primary reduction range component to the gear train, and is connected to its gear element through a one-way clutch. The second of these driven rotors is geared to furnish a secondary, coupling component to the gear train, and may be connected to its gear element through a controllable friction clutch.

The gear train embodied in the invention includes two torque input members or elements connected to be driven by the above-noted torque-transmitting rotors, controllable reaction-sustaining elements for establishing forward and reverse drive, and load shaft driving elements. A direct-drive clutch is provided for connecting the engine with the load shaft, and is engaged alternately with operation of a forward drive reaction-supporting mechanism arranged to prevent rotation of the forward drive reaction element noted preceding.

It is an object of the invention to provide in the above-stated drive system a primary forward reduction drive through the torque-delivering action of the first driven rotor and its gear train coupling, and a secondary forward reduction drive through the torque-delivering action of the second driven rotor and its gear train coupling, the gear train couplings of these driven rotors being so related to each other that when the torque capacity of the second rotor rises to a given range of values, the one-way clutch of the first rotor connection to its gear train element permits the latter element to spin, and permits the first driven rotor to seek a speed in which it offers a minimum resistance to the flow of circulating fluid in the rotor working space. This action has the advantage of producing an automatic transition from initial low forward drive range to a second speed ratio range.

Another object of the invention is to provide an additional transition of drive between second speed range and direct one-to-one drive by a fluid pressure operated servo and control system which coordinates the actuation of the aforesaid forward drive reaction-supporting mechanism with that of the direct drive clutch, so that at no time during the driving interval is there a null-torque condition.

A further object is the provision of a torque-responsive, brake-actuation servo booster device, made effective by application of fluid pressure force, the device receiving its torque-assisted force from helical gearing of the gear train, for the purpose of obtaining the required reaction brake holding force in part from the reaction torque force of the helical gearing, and for the further purpose of obtaining a coordinated shift-interval timing response of the brake with a high degree of accuracy, such that there is no surge of drive torque either upon upshift to direct, or downshift to reduction range. The advantages of this mechanical servo booster and fluid servo mechanism also include an accumulator operation yielding overall smoothness of operation not believed provided in other drive control mechanisms in this field.

An additional object is to provide in the described combined fluid turbine rotor and compound gear train, reduction drive in which are made available plural ratio ranges obtained through the different torque ranges of the two driven rotors above noted, with reduction drive being established solely by actuation of the stated forward drive reaction element of the train, and operably disestablished by controlled release of said reaction element.

It is a further object to provide in the stated drive assembly a special form of compound gear train, of epicyclic or planetary type having two input members each arranged to impart a forward drive torque component to the gear train during the actuation interval of said reaction element for forward drive, and having a reverse reaction brake for the gear element which is clutched to the second rotor for forward drive, and is braked for establishing a reverse driving torque derived from forward rotation of said first rotor and its connected gear element. The primary advantage resulting from this arrangement is the obtaining of a reverse drive in the gear train through economical utilization of some of the same drive elements which appeared in the forward drive train operations.

Another object is the provision of a fluid turbine device having two torque-transmitting rotors, a first rotor being located in the outer radial zone of the fluid turbine working space, and bladed to rotate faster than the driving impeller, and the second rotor being located in the inflow zone radially inward of the said first rotor, and capable of providing both fluid stream redirection and torque coupling.

The demonstration herewith described below in detail shows a planetary or epicyclic gear train having two distinct units, a front unit adjacent the turbine device, and a second unit located at the rear of the assembly. Each of these units is of so-called simple planetary gear form having a central sun gear, meshing planet gears on a carrier, and an externally meshing annulus gear. In the present demonstration, the two sun gears of the two units are tied together, and the annulus gear of the first unit is fixed to the carrier of the second unit, this carrier being connected to the load shaft. The carrier of the first unit is connected to the second rotor through a disengageable clutch, and is braked for providing reverse drive. The annulus gear of the second gear unit is braked for all forward reduction drive. The two sun gears are driven by the first rotor through the stated one-way clutch. The relative ratio dimensions of the gear elements of the two units may be selected for optimum torque range considerations and are not critical, although for a desired overall performance result, the present demonstration shows the rear unit annulus gear and sun gear of larger diameters than the corresponding gears of the front unit.

It should be understood that the compound gear unit embodies two important simultaneously operative features, that of acting as a torque combining gear capable of adding two separate input torque fractions, and that of providing multiplied torque under the control of the above mentioned drive reaction-sustaining elements.

It is an additional object to provide a sequential arrangement of the aforesaid rotors in the working space of the turbine device in which the fluid body is imparted kinetic energy by the radially bladed impeller in the outflow zone, an initial fluid torque is absorbed by the first rotor in the outer radial zone, a secondary torque is absorbed by the second rotor in the inflow zone, with the second rotor equipped with radial blades, a first set located at the entrance of the second rotor to receive directly the exit flow from the first rotor, and a second set located immediately adjacent the exit of the first set. It is an object to pivot the first set of the second rotor blades and to locate thier pivots such that the pivoted blades may swing into abutment with the adjacent fixed turbine blades of the second set, so that the pivoted blades in a predetermined angular relationship to the fixed blades provide a redirecting action to the fluid stream passing thru the second rotor, and in other positions may swing freely in accordance with the flow angle direction of the circulating fluid stream, or assume a flat angle coupling relationship.

A supplementary object of the invention is to provide a special braking action to supplement the normal engine braking effect under downhill driving or coasting, the special provision herein being of controls for engaging the above-noted direct-drive clutch during the drive interval when the gear reaction element is stopped, the resultant of the overtaking drive and reaction-locking being to spin one of the driven rotors as an impeller of the fluid body of the turbine device for obtaining a dynamic churn braking effect in the fluid body, the heat thereof being extracted by the engine cooling system during its "downhill" braking cooling cycle, under minimum fuel consumption conditions as when coasting.

The coordination of this overtaking braking feature with the minimum fuel, cooling cycle of the vehicle engine is believed to possess novelty.

It is a further object to provide a separate friction clutch in the power connection of said third rotor to its gear train element, which clutch shall be engaged at all times except when the control devices for the transmission assembly are set in neutral drive control positions, or may be desired to establish release of the connected shafts during reverse drive; the advantages herein being the stopping of idling gear noises, and of making it possible to tow the vehicle at high speeds with all potential power-handling members running free, without drag.

Other and additional objects and advantages will appear in the subjoined specification, in which:

Figs. 1 and 1a together show a vertical section of a complete transmission assembly embodying features of the invention, with the fluid turbine device shown in Fig. 1 and the coordinated gear train in Fig. 1a.

Fig. 2 shows the floating blades of a driven rotor in coupling position, and Fig. 3 shows them in abutment with the fixed rotor blades for re-directing the flow.

Fig. 4 is a general diagram of the drive torque ratios compared with vehicle speeds in miles per hour, as an example of the torque proportions provided by the plural driven rotors of Fig. 1 thru the gear train of Fig. 1a.

Figure 1A:
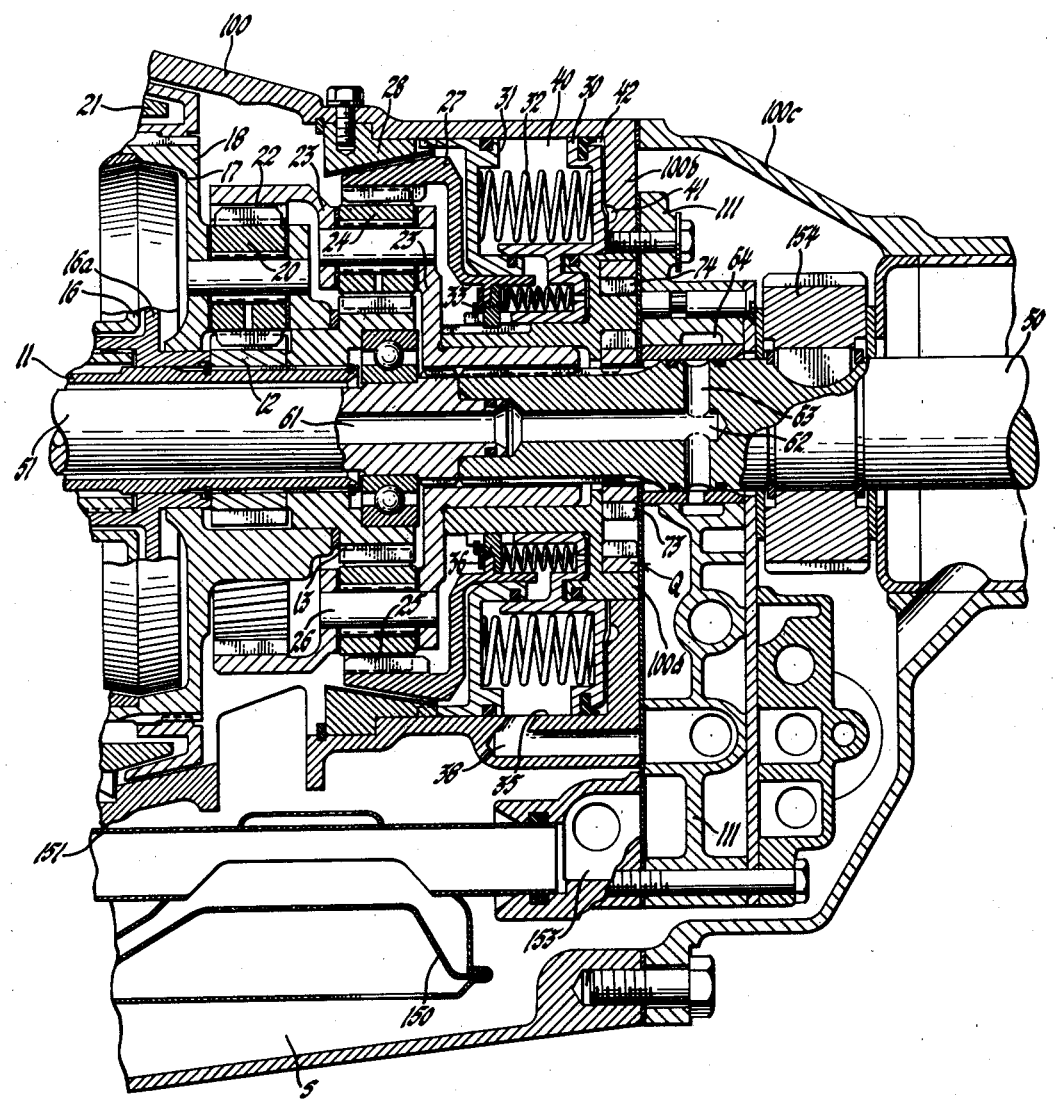

The principal elements of the drive trains of the assembly of Figs. 1 and 1a consist of three bladed turbine rotors arranged to drive two members of a compound planetary gear train comprising two simple planetary units each having a member connected to the load shaft. The engine shaft 1 is fixed to flywheel 2 bolted to drum 3 of rotor 4, which acts as an impeller, capable of moving a fluid body outward radially of the rotor working space, for generating circulating flow in the direction of the arrow. The moving body of impelled fluid impinges on the blades of the adjacent rotor 5 and in sequence on the blades of the rotor 6, recirculating to the inlet of rotor 4 across the inner radial zone of the toroidal working space formed by the blades of the rotors. The drum 7 of rotor 5 is fixed to the external ring 8 of a one-way clutch, the internal ring 10 of which is attached to shaft 11 joined to both sun gears 12 and 13 of the first and second planetary gear units shown in Fig. 1a. The rollers 14 of the one-way clutch lock the rings 8 and 10 together when drum 7 is urged to rotate faster than shaft 11, and releases them when the shaft rotates faster than the drum.

Turbine rotor 6 is attached to shaft 15 fixed to clutch members 16 and 16a, the mating clutch member 17 being affixed to rotate with drum 18 which acts as a carrier for the spindles of the planet gears 20 of the first gear unit, and is provided with a braking surface for brake-applying cone 21. Planet gears 20 mesh with sun gear 12 and annulus gear 22 attached to carrier 23 for planet gears 24 of the second unit. The planet gears 24 mesh with sun gear 13 and with annulus gear 25 of the second unit, and revolve on spindles 26 joining the two parts of the carrier 23 fixed to rotate with output shaft 50. Drum 27 of annulus gear 25 moves laterally to be braked by cone 28 for establishing drive reaction for forward reduction gear drive of the assembly. Cone 21 axially loads drum 18 to provide reverse drive reaction, pressing the external mating cone portion against the housing 100.

For a given load on output shaft 50 connected to carrier 23 and to annulus gear 22, with braking cone 28 applied to stop the annulus gear 25, when the impeller 4 is accelerated by engine speed increase, the rotor 5 endeavors to transmit a torque to shaft 11 and to sun gears 12 and 13 through the one-way clutch 8—14—10. This torque is multiplied by the fixed compound ratios of the two gear units, to drive shaft 50 at a low speed or reduction ratio. With clutch 16—17 engaged, the shaft 15 with rotor 6 are required to turn at a predetermined speed slower than that of rotor 5.

Figure 2:
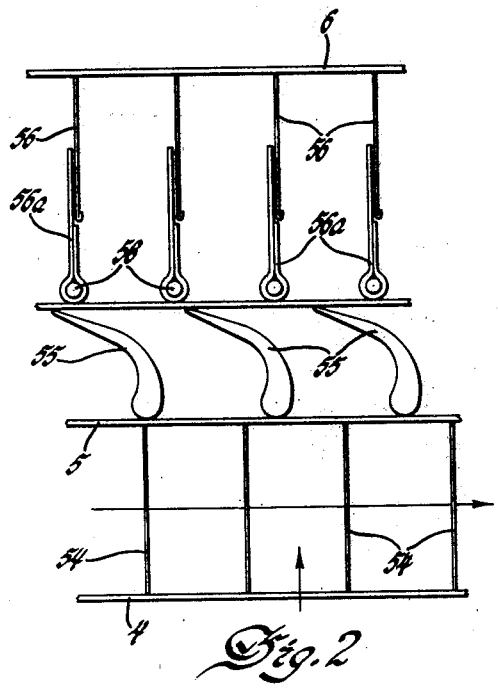
Figs. 2 and 3 are development diagrams illustrating the sequence of circulating flow around the working space of the fluid turbine device of Fig. 1. The solid line vertical arrow in both figures shows the direction of flow of the fluid body, and the horizontal thin-line arrows show the normal hand of rotation of the rotor elements.
Figure 3:
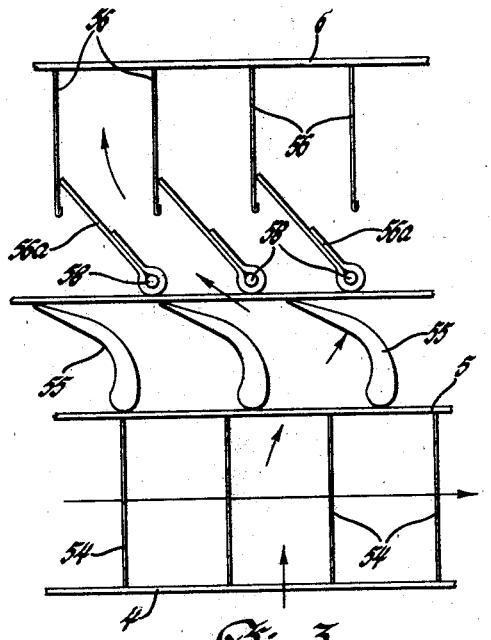

This action will be better understood by reference to Figs. 2 and 3. The blades 54 of impeller 4 are of straight radial form, without curvature, as likewise are the fixed blades 56 of the third rotor. The blades 55 of the second rotor 5 have pronounced backward bend in section, as indicated in Figs. 2 and 3 so that they may act as turbine buckets to absorb torque from the circulating fluid. The vertical arrow of Fig. 2 represents the direction of flow of the circulating fluid around the core ring of the turbine device. The horizontal arrow represents the normal direction of shaft and rotor rotation. Fluid emerging from the pockets of blades 54, due to rotation, has a forward flow component which imparts a forward torque to blades 55. Fluid emerging from the pockets of blades 55, because of their strong curvature, under certain circumstances will have a backward component. Blades 55 have sufficient curvature and are located in the working space such that rotor 5 is urged to rotate forward faster than impeller 4. It is known in this art that a higher rotational velocity may be imparted from an impeller to a driven turbine, in cases having the point of fluid transfer in the outer radial zone, and in which the energy-receiving blades are of a given maximum curvature concave in the net direction of fluid flow, as illustrated in Figs. 2 and 3. It is thus obvious that the third rotor 6 in this arrangement receives backward rotating fluid in the initial stages of operation while acting as a forwardly rotating reaction element. Blades 56a are pivoted on pins 58 in the rotor 6 to swing against the adjacent inlet ends of the blades 56 under a negative flow component, and in so doing, redirect the flow. Under this condition, rotor 6 is subject to a reverse fluid torque component applied by the impingement of the stream on the faces of blades 56a and 56.

Extending this reasoning, if load be applied to the gear train output shaft 50 by application of brake 28 to annulus gear 25, the one-way clutch 8—14—10 will lock, and shaft 11 will be driven by rotor 5. Under these circumstances, the torque provided by rotor 5 is further multiplied by the gear train low gear ratio, when brake 28 holds drum 27 of Fig. 1a, and at the same time, due to the enforced rotation of carrier 18 by the gear train elements connected to, or coupled to it, the turbine rotor 6 is required to rotate forwardly, even though the fluid reaction effect on the blades 56 and 56a is endeavoring to rotate rotor 6 backwards. As engine speed is advanced, and the output shaft 50 and connected gear elements achieve forward rotation, the reaction force on rotor 6 diminishes, as explained below in detail, and it is eventually urged to rotate forward, finally taking over all of the torque being delivered. During the initial drive phases, the pivoted blades 56a change from the Fig. 3 to the Fig. 2 position.

The general physical structure of the drive assembly is supported in casing 100, webbed transversely at 100a, the web forming a pump body cooperating with portion 101, and having sleeve extension 102 for seal 103. The portion 100a is recessed at 104 to provide a cylinder for brake piston member 21 and portion 101 has an overhanging sleeve extension as a guide for one of the sections of clutch 16. Passage 105 in the wall of 100a delivers brake actuator pressure to move piston 21 to the right for loading cone 18a against the mating inner face of housing 100. Passage 106 in the wall of portion 101 leads actuator pressure into the central space 107 between the halves of the clutch cones 16—16a for gripping the external cone sections of member 17.

The rear portion 100b of casing 100 is shaped to provide a body for pump Q, to provide a cylinder 35 for members 30 and 31 and supports a control valve body 111, located inside casing section 100c. Member 31 is a backing member and 30 is a moving piston.

The forward portion of shaft 50 is splined to the collar of carrier 23, the splining of which accommodates the rear splining of central shaft 51, the forward end of which is splined to hub 52, of vibration damper unit D, the outer web 53 of the latter being keyed at 54 to the direct drive clutch plate 65. The flywheel plate 2 is recessed at 66 for annular clutch piston 57, and the rightward portion of plate 2 has a radial flat backing plate dimensioned to take the thrust of piston 57 when the piston is applied to load the clutch plate 65.

Fluid pressure is fed to clutch cylinder 66 thru passage 58 in member 2, from space 60 forward of the end of shaft 51, from drilled passage 61 in shaft 51, connected to mating passage 62 in shaft 50, and from radial passages 63 open to gland passage 64 in the valve body 111. When clutch 65—57 is engaged, the engine shaft 1 is connected to the load shaft 50 at 1-to-1 ratio.

The fluid pressure supply is provided by gear pumps P and Q. Pump P consists of driving gear 70 driven from sleeve 71 attached to drum 4, meshing with idler gear 72 mounted inside body 100a. Pump Q consists of driving gear 73 splined on shaft 50 meshing with idler gear 74 supported inside housing 100d bolted to web 100b. The passage 75 feeds pumped oil under pressure to the toroidal working space formed by the rotors 4, 5 and 6 to maintain the oil body under a dynamic pressure head, to avoid cavitation, and to promote proper cooling circulation of the oil body thru the working space of the rotors.

Under neutral drive condition, it is desirable to provide a complete release of drive such that a maximum of safety is embodied in the drive mechanism and its controls, and to avoid noise of idly spinning gears.

Clutch 16—17 is arranged to uncouple the carrier 18 of the front unit from shaft 15. The clutch 16—17 in the present demonstration serves to cut down idling noise of the gearing, and to reduce the idling drag which otherwise might add to creep and to engine starting loads to be overcome.

The two parts 16 and 16a are keyed together for common rotation with shaft 15, and have a piston and cylinder relationship, retracted by springs 45 and expanded by pressure fed to the space between them by passage 106. The outer faces of 16 and 16a are cone-shaped to grip the inner faces of drum 17 shown. This clutch is disengaged by release of fluid pressure, for neutral, and is engaged by the pressure for all of the drive requirements.

It is possible to disengage it for reverse drive, when brake piston 21 is applied to grip the drum section 18a to the housing 100, but in the present demonstration, it is preferred to maintain it engaged, to facilitate transfer between forward and reverse drive, when the driver of the vehicle may be required to rock the car out of a low traction area.

Figure 7:
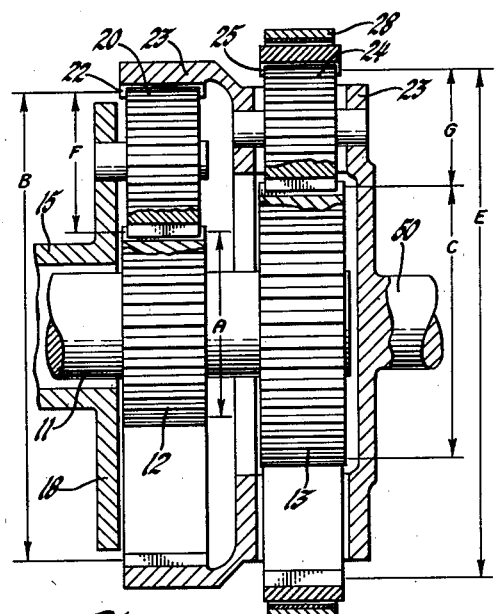
Fig. 7 is a schematic diagram of the type of gear train of the demonstration, simplified for better understanding of the operation of the Fig. 1a construction.

The shafts 11 and 15 are assumed to have normal clockwise rotation when viewed from the left of Figure 1a, and also Fig. 7. The teeth of all the planet gears of the compound train are inclined, or helical. In the rear unit, the teeth of sun gear 13 are of right-hand inclination, the teeth of planet gears 24 are of left-hand inclination, not shown in Fig. 7, and those of the annulus gear 25 are of right-hand inclination. Under applied torque on the sun gear 13 the thrust on planet gears 24 will be rearward, and the thrust on the annulus gear 25 will be forward, or to the left in the Fig. 1a showing. This arrangement applies a torque-derived loading force tending to press the cone-shaped member 27 to the left and to hold it toward the left during the interval when torque is being delivered to the sun gear 13.

Under neutral conditions, member 27 and annulus gear 25 are free, and there is no energization by either servo pressure or by helical gear thrust. When 27 is moved to contact non-rotating brake ring 28, a reaction force is at once generated by the sun gear 13 attempting to transmit multiplied torque to output carrier 23, fulcruming from the annulus gear 25, and member 27 is drawn or thrust to the left as above described.

When the second speed ratio range is established by the drive of rotor 6 applied to carrier 18 of the front unit, the degree or magnitude of the thrust on the annulus gear 25 is diminished because of the ratio relationships of the gearing, and since less force is required to sustain the torque reaction in this range of drive ratio, the augmented, torque-assisted reaction-holding force, is automatically changed to a lower value, commensurate with the lessened need, and conversely increased for a higher torque reaction requirement.

Under overrun conditions, there will be a tendency for the helical thrust force to reverse, during both reduction ratio drives, but this action is lessened by the fact that when the overtaking torque overspeeds the shafts 11 and 15 the sun gear shaft 11 tends to run faster than the rotor 5, and since the sun gears 12, 13 are relieved of direct load, by the one-way clutch 8—10—14, the thrust reversing force does not release the braking action on the annulus 25, due to the applied fluid pressure holding force.

The fluid pressure braking mechanism for brake 27—28 of Fig. 1a is housed within the casing 100, its web piece 100b and the pump body piece 100d, the latter having a forward extending portion inside which the sleeve of the right half of carrier 23 runs and is guided. A sliding spring-retainer, piston member 30 fits into the cylinder space 35, and supports the rightward thrust of springs 32 and 33. The inner springs 33 bear against a ring 36 locked in the forward end of the member 30. The member 31 acts as a pilot for axial motion of members 27, is keyed to the non-rotating ring 28, and supports the axial thrust of springs 32. The space 40 between members 30 and 31 is connected to the control valve body 111, by passage 38, and the cylinder space 42 to the right of member 30 is connected to the valve body by passage 41.

As stated above, the cylinder space 66 of the direct drive clutch 65—57 is connected to passage 64. In the valve body 111 the passages 64 and 38 may be control-connected so that at all times when the direct drive clutch 65—57 is engaged, the space 40 between members 30 and 31 is under the same pressure. At the same time, the cylinder space 42 to the right of member 30 will be open to the same pressure. The fluid pressure between the members 30 and 31 is therefore balanced out by the fluid pressure at the right of member 30 so that the springs 32 and 33 hold the drum 27 out of braking engagement with fixed ring 28.

To engage 27—28, the loading pressure between the members 30 and 31 is relieved or released and the pressure to the right of member 30 is then permitted to compress the springs 32 and 33, and to furnish an initial brake loading force to member 27, thru spring 33. Additional travel of member 30 compresses springs 33 to the physical limits of the connected parts and members 30 and 27 are then in full mechanical abutment for delivering the fluid pressure force directly to member 27.

Conversely, to release the reaction brake 27—28, the space between members 30 and 31 is supplied with pressure oil simultaneously with the application of the pressure to again load clutch 65—57 for engagement, while again balancing out the fluid pressures.

In this manner, the drive shift transitions are completely under timing control, and there is no free running release of idly spinning parts during the drive interval. The resulting torque overlap between the clutch and the brake 27—28 provides shift smoothness augmented by the peculiar helical gear thrust torque relationship described above.

During downshift when the delivered torque of the clutch 65—57 is being diminished, the initial energization value of the brake members 27—28 increases proportionally as the torque capacity of the clutch drops, because of the resultant increase of relative motion in the gear train which applies an increasing helical thrust to annulus gear 25, there being a graduated rise of torque reaction force, as the clutch torque capacity falls off to zero, the effect being initially augmented by the force transmitted through the springs 33 and affirmed later by the solid abutment action of members 30 and 27. If the space between members 30 and 31, and the clutch cylinder 66 are vented rapidly, the proportional reaction torque response of the helical gear thrust effect also rapidly increases, so that there is a mutual proportionality between these actions.

During upshift, the servo fluid pressure is valved from the valve body 111 into the space 40 between the members 30 and 31 and into the clutch cylinder 66. As soon as the clutch 65—57 begins to develop torque capacity, there is a corresponding diminishing of helical thrust braking force on the members 27—28, as well as the balancing or equalizing action of the pressure in space between the members which permits springs 32 and 33 to eventually release the brake 27—28. Here again, the timing action of the shift of ratio is determined in part by the torque capacity and reaction torque effects described.

There is an accumulator action during both upshift and downshift due to the rising or falling force effect of the springs 32.

Under balanced pressure conditions, the springs 32 are exerting their own unbalancing force upon the piston 30. This force is relatively small when piston 30 is fully retracted to its right-hand position, but rises to a substantial value when 30 has been moved to full stroke for full engagement of cone 27 with cone 28.

For upshift, space 40 is being filled simultaneously with clutch cylinder 66. When the pressure in space 40 reaches a given level, its force on piston 30, augmented by the substantially increased force of spring 32 equals the force of the full line pressure in space 42 behind piston 30. Further flow into 40 will now move piston 30 to the right, while member 27 still remains in contact with 28, under the force of springs 33. As piston 30 moves, springs 32 diminish in load force. This compels the oil pressure in space 40 to rise correspondingly, so as to balance the full line pressure force in space 42. In this way, the oil pressure in 66 and in space 40 has a gradual rise during the clutch engagement of 65—57, which increases the clutch torque capacity gradually.

When piston 30 is fully moved to the right, member 27 is also fully released from fixed cone 28.

For downshift, when the hydraulic system connecting space 40 with 66 is exhausted thru a fixed orifice not shown, the line pressure acting in space 42 begins to move piston 30 to the left.

The discharge pressure in space 40 and cylinder 66 is nearly equal to the line pressure in space 42, since the force of springs 32 at this time is small. When piston 30 moves farther to the left, springs 33 apply cone 27 to ring 28, and their force on piston 30 is added to that of spring 32 resulting in a substantial reduction in discharge pressure in space 40 and cylinder 66. Further motion of piston 30 to the left results in further compression of springs 32 and 33 and in further dropping of the discharge pressure in 40 and 66 to weaken the clutch holding pressure to a lower torque capacity point, so that the clutch releases gradually, whereupon the gear train elements begin to rotate relatively and the above described helical gear thrust action ensues.

The diameter of the fixed exhaust orifice mentioned above regulates the timing rate of the above-described action.

Drive may continue in second speed range as long as desired, the torque multiplication being that provided by the gear train, and with a very low slip factor between rotors 4 and 6, in the present demonstration, depending on the gradients, acceleration requirements and related power and load factors.

Shift to direct drive obtained by clutch 65—57 being engaged, releases the brake 27—28 automatically, as above related, and the reduction drive elements merely idle. Downshift may be chosen such that the ensuing reduction drive will be in low or second ratio range depending upon the car speeds at which this shift is made, this result being demonstrated by the chart of Fig. 4.

Shift from neutral to reverse requires that the brake member 21 be loaded to grip section 18a to the housing 100. This stops carrier 18 and the forward rotation of sun gear 12 requires annulus gear 22 to drive shaft 50 in reverse. Sun gear 13 spins planet gears 24, and annulus gear 25 idles.

Shift from reverse to low requires brake piston 21 to be retracted by springs 43 as fluid pressure is released from cylinder 44, and brake 27—28 to be applied by pressure delivered to cylinder 42, but during this shift, the application of 27—28 is directly accomplished as distinct from the downshift change from direct, during which the servo pressure which had been acting in space 40 and to the right of piston member 30, is withdrawn from space 40.

It will be seen that the brake 27—28 is energised for locking annulus 25 against rotation by two distinct types of control, one in which the fluid pressure application is directly upon a piston member, and the other in which the actuation is obtained by withdrawal of a balancing pressure, the resulting unbalance permitting the required force motion.

The present invention is directed more particularly to the drive structures, and refers to the controls merely to disclose a completely operative construction; therefore no details of valving in the valve body are herein given, it being understood that a general arrangement of fluid pressure servo directing valves to deliver actuation pressure to the cylinders of the pistons of the clutch and brake actuator mechanisms in the above-stated sequences, may take many forms.

As described herein, the servo delivery requirements for valving to provide the above-noted ratio shift patterns would be based on the following actuator pressure needs:

| Drive | Brake 27-28 | Brake 21-17 | Clutch 16-17 | Clutch 65-57 |
|---|---|---|---|---|
| Neutral | | | X | |
| Low Range | X | | X | |
| Second Range | X | | X | |
| Direct | | | X | X |
| Reverse | | X | X | |

This pattern therefore requires the following fluid pressure feed from the servo valve body:

| | 41 | 105 | 106 | 64 |
|---|---|---|---|---|
| Neutral | | | X | |
| Low Range | X | | X | |
| Second Range | X | | X | |
| Direct | | X | X | X |
| Reverse | | X | X | |

It will be noted that the control valving feed to the space 40 between the members 30 and 31 of Fig. 1a, will need to distinguish between the delivery requirement for alternate shift between direct and forward reduction as against reverse and forward reduction, because of the need for the two kinds of reduction reactor actuation, one in which there is direct application of the brake 27—28 in shifts from neutral to low, and the other in which there is unbalancing pressure application in shifts made during forward drive between reduction and direct. The valving therefore is required to cut off the feed to the space 40 between the members 30 and 31 for the first, and to connect same during the latter shift cycle.

A further requirement of the valving is that the delivery passages 64 and 41 to the cylinder spaces 66 and 42 must be arranged for simultaneous delivery of the servo pressure, so that for "downhill" braking, the clutch 65—57 can be engaged while brake 27—28 is operative to apply reaction for spinning carrier 18, shaft 15 and rotor 6. With this control, the pressure in space 40 is relieved by the valving, but maintained in clutch cylinder 66.

In reverse drive the drum 18a is braked by member 21, which stops the carrier 18 of the front unit, and also stops the shaft 15 and rotor 6. The vanes 56a of rotor 6 are moved by the emerging stream from the blades 55 of the first rotor 5 to occupy the positions indicated in Fig. 3, and a higher velocity component is thereby developed in the fluid body circulated to the impeller 4 and recirculated thereby. In this action, since rotor 6 is now stopped, instead of rotating forward as in forward low range, a different torque multiplication value is derived from the fluid turbine device, and this is further multiplied in the gear train by the rotation of sun gear 12 reacting thru the planet gears from carrier 18 to drive annulus gear 22 and the connected output shaft 50 reversely. The rotor 5 which provides forward torque multiplication to the sun gear shaft 11, also provides torque multiplication in reverse drive. In each case the one-way clutch 8—10—14 transmits the torque which is further multiplied by the gear train reactions.

The pumps P and Q draw oil from the sump S through strainer 150 and manifold pipe 151 anchored in the casing. The forward end of 151 is open to passage 152 in the housing, connected to the intake of pump P, and the rear pump Q draws from a passage, not shown, connected to the space 153 in Fig. 1a. The gear 154 fixed to shaft 50 is for driving accessory equipment such as a speed responsive device to be used in controlling valving located in body 111.

Figure 4:
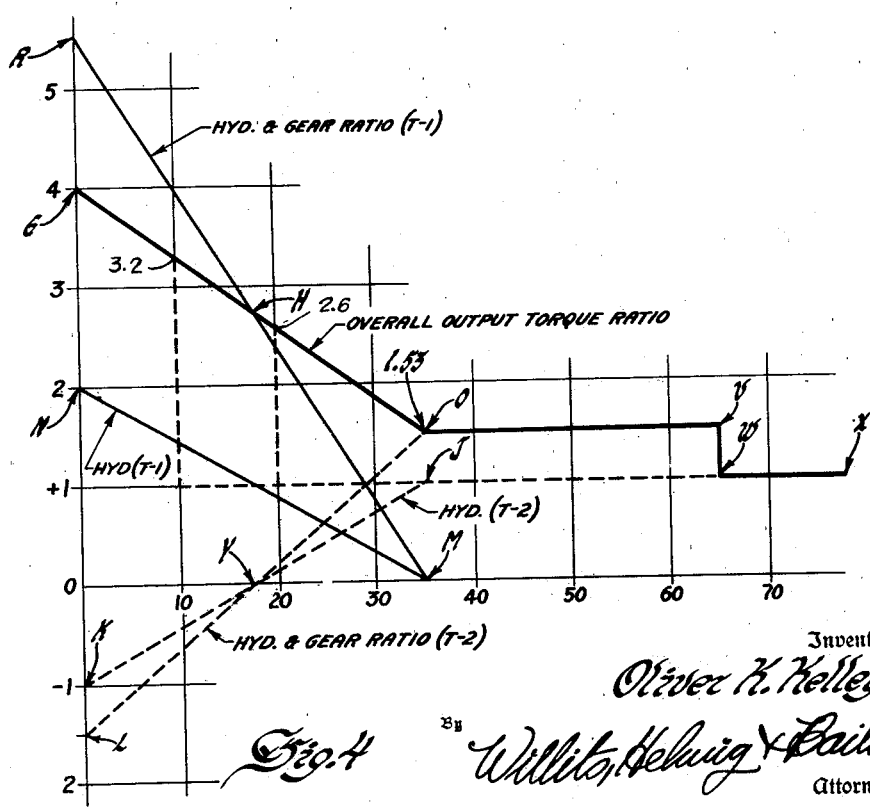

The chart of Fig. 4 is devised to show clearly the relative torque contributions of the different rotors and of the gear train multiplication arrangement to overall torque or driven shaft torque, shown in the heavy solid line G—H—O—V—W—X. It will be noted that at the 1.53 torque ratio point O the available torque is that of the gear train with carrier 18 as the driver, annulus gear 25 being held, and with the rotor T-2 (rotor 6) providing all the drive by 1-to-1 fluid coupling at about 35 miles per hour of the vehicle at point J. This overall speed ratio of the drive is considered as being in second range, or about 0.65, the reciprocal of 1.53 torque ratio. The chart shows the full power relationships. During the initial drive stage, when T-1 (rotor 5) is providing the low range drive torque, its net torque contribution exclusive of the gear train multiplication starts at point N, at torque ratio value of 2 to 1, while its gear train multiplied torque would be about 5.5 to 1 as at point R. During the interval when T-2 (rotor 6) is not contributing any positive torque, and is actually subtracting from the net overall torque by the reaction of the fluid on its vanes, rotor 6 ceases to have a negative torque effect at about 17 M. P. H., on the diagram, and begins to contribute a coupling effect to the drive, which terminates at the 1-to-1 torque ratio point J at 35 M. P. H., on the diagram. Its torque multiplied by the gear train ratio is shown in the line L—O. The peculiar dual role of rotor 6 first as a forwardly rotating reaction rotor, able to subtract torque ratio from the positive torque ratio supplied by the rotor 5, and, secondly, beyond point Y, able to provide a coupling drive up to the 1-to-1 input ratio point J, is believed unique in this art.

The solid line N—M marked "T-1 (hyd.)," represents the torque ratio contribution of the rotor 5. The solid line R—M, marked "T-1 (hyd. and gear ratio)," represents the torque ratio contribution of the rotor 5 multiplied by the ratio of the low range path of the gear train.

The dashed line K—J, marked "T-2 (hyd.)," shows the negative torque ratio of the rotor 6 which changes at point Y to a positive coupling torque and continuing to point J. The dashed line L—O, marked "T-2 (hyd. and gear ratio)," represents the gear train multiplied torque ratio of rotor 6 having a negative value up to point Y, and a positive torque ratio value from Y to O. From this it will be seen that rotor 6 eventually may assume all of the coupling drive for second speed ratio range and that rotor 5 is incapable of delivering any multiplied torque beyond the point M on the M. P. H. scale.

For simplicity in understanding these factors, it should be understood that the relative numerical values given here are merely illustrative for teaching the principles involved in the invention, and that other ranges of values may be chosen, to suit desired performance characteristics for a particular design of vehicle.

The line O—V refers to the desirable speeds within which the direct drive clutch would be normally engageable, so that a driver could upshift to direct anywhere along the ratio line of 1-to-1 between J and W, or between 35 and 65 miles per hour. The specific controls for such a shift to direct would be arranged to permit this shift. For avoiding abuse of the mechanism it appears desirable to limit the ability of the driver to enforce downshift at speeds above 65 miles per hour, hence the line V—W, continuing to X along the 1-to-1 ratio line. This is an arbitrary limitation, and the limit speed of this shift point may be set at higher vehicle speeds, assuming the drive structures are made to support the loads. Upshift to direct may also be chosen over the 20 to 35 M. P. H. range, wherever usage may require, but if it occurs below 35 M. P. H., some of the performance advantage of multiplied torque will be lost, if the specific data of the Fig. 4 chart be utilized. Further, for driving comfort reasons, once having shifted to direct, the car driver may elect to remain in that 1-to-1 ratio down to low road speeds approximating 10 M. P. H., and only release clutch 57—65 and engage brake 28 when reduction ratio performance is required, whereupon there is available at that road speed a torque ratio of about 3.2 to 1, as indicated on the chart, as soon as the engine is accelerated. If it be decided to make this shift at 20 miles per hour, available torque ratio will be about 2.6 to 1.

For safety in descending hills, it is believed important to add to the facilities for obtaining additional power-line braking, for augmenting the engine-braking effect, available in reduction ratio drive.

The present invention, therefore, provides operative structure useful for this purpose. When driving in reduction drive, as when descending a hill, the direct drive clutch 65—57 may be safely engaged, and there is available the normal engine braking effect and a further braking action. During this interval, the brake 28 is already applied to drum member 27, the reaction annulus gear 25 is stopped, and since the load shaft 50 is driving the carrier 27, the planet gears 24 are required to spin on the teeth of 25 and to apply a forward rotation component to the sun gear 13. Simultaneously, annulus gear 22 is at load shaft speed, and a compound couple from sun gear 12 and annulus gear 22 is applied to planet gears 20 of the front unit, resulting in overspeeding of carrier 18. With the clutch 16—17 engaged, this overspeed rotation is thereby applied to shaft 15 and rotor 6. The fluid body of the working space is impelled to circulate clockwise in Fig. 1 at a circulating velocity differing from that which could be imparted by engine idling speed of impeller 4, and in the opposite direction of circulatory rotation, hence the reverse-hand impeller effect may endeavor to drive the engine faster than permitted by the fixed 1-to-1 couple of clutch 65—57, by reference to Figs. 2 and 3. It appears, therefore, that the operator by actuation of clutch 65—57 and with brake 27—28 applied may cause the rotors 4, 5 and 6 of the working space to exert a powerful dynamic braking effect within the fluid body working space. The resultant churning of the fluid causes the temperature of the fluid body to rise, and there is no friction brake absorption of this energy, as there is in ordinary vehicle braking. This effect is noted as dynamic to distinguish from the ordinary coupling, dynamometer effect.

Figure 5:
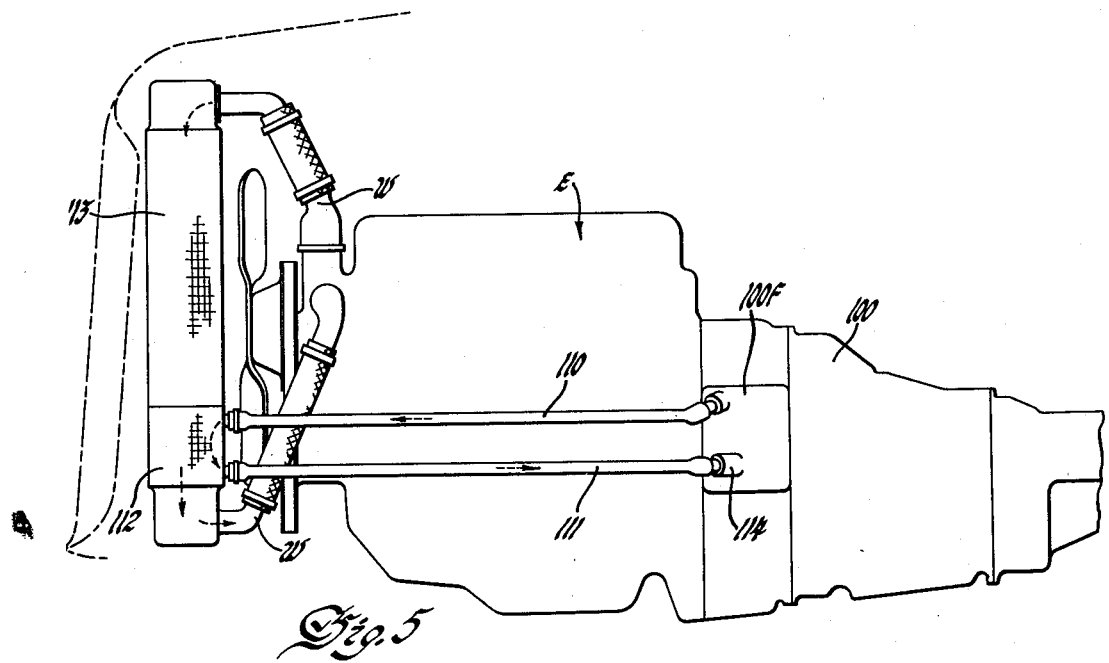
Fig. 5 is an outline diagram in part section, describing the operation of the engine cooling system as coordinated with the oil cooling for the oil body of the working space of the fluid turbine device of Fig. 1, especially for coasting or downhill grade driving.

Figure 5 shows a schematic oil cooling arrangement by which the fluid body of the working space is circulated to an oil heat exchanger 112 cooled by the liquid of the engine cooling system, and returned to the sump space S connected to the suction leads to the two pumps P and Q.

Under coasting or downhill driving, the engine throttle will be at idle, and with only idling fuel being consumed, the normal engine cooling system temperature drops, as is common experience. There is then, surplus cooling capacity available for extracting heat from the oil cooler 112 cooled by the circulating liquid of the engine cooling system. It is believed new to provide herein the transmission ratio actuator for stopping a gear reaction element to cause a fluid rotor to spin during direct drive conditions, and by spinning, to act as a churn brake, with the resulting heat energy dissipated through the downhill or coasting cooling phase of the coordinated engine, and oil cooling system.

The casing 100 has plate 100f attached at the side, for cooler feed pipe 110 and cooler outlet pipe 111. Inside the transmission assembly of Figs. 1 and 1a, the outlet drain from the turbine device is led to pipe 110 leading to oil cooler section 112 of the radiator core 113, of the schematic view of Fig. 5. The oil from cooler section 112 is returned through pipe 111 to connection 114 whence it is delivered to sump S. The top and bottom connections of the core 113 are connected to the regular water cooling system W of the engine E. Further details are not believed required for one to understand the use of this feature of the invention. Actual experience with this feature discloses that the arrangement permits absorption of as much as 20 H. P. at 35 M. P. H., a welcome addition to braking for drivers operating in hilly country.

A further cooling adjunct to that described in connection with Fig. 5 is the air cooling arrangement built into the casing 100 and input rotor 4 of Fig. 1. The casing 100 has air inlets 201, which may be screened to avoid dirt getting into the mechanism. The drum 4 is finned at 202, its rotation forcing air to flow radially and axially, forward and outward to air vent passage 203, open to atmosphere through passages not shown which may be baffled against exhaust noise if required. The rotor working space is a closed mechanical system, sealed at 103. The feed of the fluid body from the pumping system is from space 75, along the axial space between shaft 15 and the adjacent outer sleeve 71 of the rotor 4, and radially outward through passages 204 to the working space. This oil is required to move outward by the centrifugal force applied by the rotor 4, to augment the primary pump pressure. Relief from the working space is by the outer partings on either flank of the rotor 5, into the space at the left of rotor 7, radially inward to passages 205 in the hub extension of rotor 7, into space 206 at the left of one-way clutch ring 10, through passages 207 in the ring 10 and along the axial space between shafts 11 and 15 to radial passage 208 open to space 209, which latter is connected to the external passage 110 of Fig. 5 leading to the heat exchanger 112.

This arrangement provides a type of two-stage cooling in which the oil body flowing generally outward in the working space inside rotor 4 is cooled by the air flow over the outer walls of drum 3 of rotor 4, the drum body acting as a primary heat exchanger, and the oil under pump pressure is then delivered to the engine cooling system arrangement of Fig. 5 for further cooling. The two-stage cooling system assures not only a steady extraction of heat from the working oil body under normal operating conditions, but also provides extra cooling when the oil body takes part in the dynamic brake action described in connection with Fig. 5, under the downhill or coasting braking requirement.

Figure 6:
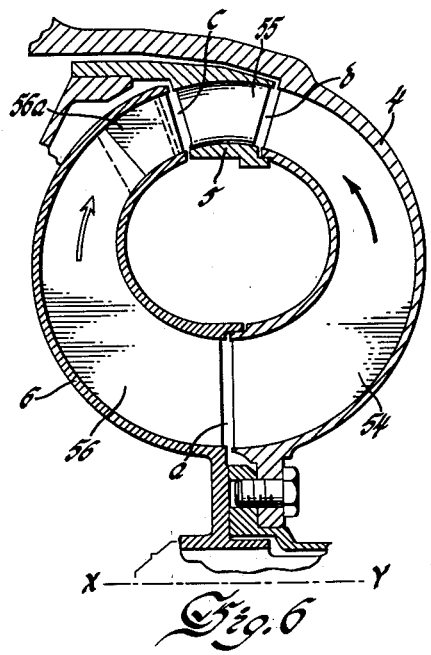
Fig. 6 is a sectional diagram of the rotors of the fluid turbine device of Fig. 1 noted particularly for the space locations and operation of fluid body and blade elements under different torque conditions.

In Figure 6 the diagram is to illustrate what is meant by the terminologies of the flow zones used in this specification. The impeller rotor 4 with its flat blades 54 in spinning about the axis X—Y, moves its body of fluid thru the outflow zone from the parting space a to the parting space b, following the solid line arrow. The fluid emerging from 4 impinges on the blades 55 of rotor 5 located in the outer radial zone, these blades being cupped as shown in Fig. 2 to extract from the flow a given range of forward component torques, delivered to the sun gear shaft 11 thru 1-way clutch 8—10—14 of Fig. 1. The fluid emerging from the blades 55 at c first passes thru floating blades 56a and either inclines them to lie angularly against the next adjacent trailing blades 56 or else causes them to lie against the leading blades and parallel to them. When blades 56a are in angular abutment as shown in Fig. 3, the net direction of the fluid torque of rotor 6 is negative with respect to the normal forward hand of rotation. The body of fluid moving from c to a may deliver a torque fraction to rotor 6. Upon recirculating across a to the entry of blades 54, the circulating fluid although having yielded a large percentage of its kinetic energy to the rotors 5 or 6, now includes a proportional value remaining as a circulation velocity component, to which is added the next circulation cycle component, upon the fluid being again moved from a to b. This latter effect is well-known in the fluid-torque converter art.

The movable blades 56a are subject to the circumferential velocity of flow of the stream entering them from the exits of the blades 55 of the first rotor 5. When that velocity is measurably less than the rotational speed of the rotor 6, the blades 56a occupy the position shown in Fig. 3 at an acute angle to the median flow center of the stream. When the velocity is more than that of rotor 6 the pivoted blades 56a are urged to occupy the Fig. 2 positions. The shift of the blades 56a from the Fig. 3 to the Fig. 2 position may occur along the line K—Y of Fig. 4, approximately at 10 to 12 M. P. H., and may be completed at 25 to 28 M. P. H., when full power of the engine is being used, in the present embodiment.

The diagram of Figure 7 represents a typical spur-gear schematic for the calculation of the different rotations and ratios of the torque-handling elements of the gear train of the Fig. 1a arrangement. As noted above, the actual gears of Fig. 1a are helical. This diagram is a simplified, conventionalized pattern of the gear train. Shaft 15 is assumed to be solidly connected to the second turbine rotor 6, shaft 11 to the first turbine rotor 5, and shaft 50 to carrier 23 of the rear unit, and to annulus gear 22 of the front unit. For clearer understanding, the diameters of the gear elements have been taken as follows, and numerical values assigned, which may be accepted as the numbers of teeth, as follows:

| | Diameter | Teeth |
|---|---|---|
| Sun Gear 12 | A | 30 |
| Annulus Gear 22 | B | 72 |
| Sun Gear 13 | C | 43 |
| Annulus Gear 25 | E | 77 |
| Planet Gear 20 | F | 21 |
| Planet Gear 24 | G | 17 | it will be observed that if annulus gear 25 be held by brake 28, the torque ratio between shaft 11 and 50 will be $$\frac{C \text{ plus } E}{C}, \text{ or } \frac{43 \text{ plus } 77}{43} = \frac{120}{43}$$

or 2.79 turns of shaft 11 for one turn of output shaft 50. This means that for one turn of shaft 11, the output shaft 50 rotates about 0.35 turn, or at a reduction speed ratio, forwardly.

Following these selected dimensional values, upon assuming that shaft 15 to be held from rotation, it is determined that for one turn of shaft 50, the annulus gear 25 will rotate forwardly 2.81 turns, and shaft 11 will rotate backwardly at 2.4 turns. If these values are divided through by "—1," we find that with shaft 50 stopped, for one turn of shaft 15 the annulus gear will revolve 1.81 turns reversely, and shaft 11, 3.4 turns reversely. Dividing these values through by "—1.81," the annulus gear 25 being held at zero rotation, the relative positive turns of shaft 11 are 5.21, shaft 15 are 2.81 and shaft 50 are 1.81. Dividing these by "5.21," it is seen that for one turn of shaft 11, shaft 15 will have 0.54 turn and shaft 50 will have 0.35 turn. It is apparent that when shaft 11 is driving shaft 50 at the primary reduction ratio, shaft 15 is required to rotate about half as fast as shaft 11.

From this, it will be understood that the turbine rotor 6 is spinning forward at about half the speed of rotor 5 when rotor 5 drives the assembly in reduction. Now if rotor 6 could be held from rotation so as to act as a fluid reaction wheel, a given range of torque multiplication with the turbine device acting as a torque converter would become available. However rotor 6 does not stand still, but is required to rotate forwardly by the gear train reaction, and therefore it acts as a rotating reaction wheel having forward drive rotation. By reference to Figs. 2, 3 and 6, it will be understood that the rotor 6 by having a forward component, is operable to act not only as a reaction wheel, but also as a coupling rotor, and may impart a degree of circulation velocity to the stream entering the impeller rotor 4. This quality is of course derived from the character of the gear train relationships, and differs sharply from prior art showing merely plural clutch coupling of two output rotors which may be differentially gear-coupled. This feature, with that of the compound planetary gear train which provides controllable reduction reaction beyond the point where the input torques are applied or combined, makes possible the conditions by which the rotors 5 and 6 may operate individually to drive in two separate overall reduction ratios.

It was stated above that rotor 5 ceased to drive when the rotation of rotor 6 was sufficient to cause shaft 11 to overspeed and release one-way clutch 8—14—10 through the gear train reaction. Returning to the assigned number values for the gear elements of Figure 7 dealt with above, it was found that with annulus gear 25 held, shaft 11 could have 5.21 turns, shaft 15, 2.81 turns when shaft 50 had 1.81 turns. Dividing these through by "2.81," we find that for one turn of shaft 15, shaft 11 has 1.85 turns, and shaft 50, 0.64 turn. Therefore with shaft 15 driven by rotor 6 as the gear train input member, the load shaft 50 will run at 0.64 reduction ratio, as compared with the low gear ratio of 0.35 derived above. This is a useful drive ratio for second-speed range. It should be noted that shaft 11 is driven ahead at 1.8, or at an overspeed ratio, so that when rotor 5 reaches its limit of ability to absorb torque from the liquid body, and rotor 6 is capable of providing coupling torque capacity sufficient to drive carrier 18 through shaft 15, the sun gear shaft 11 is driven forwardly faster than the rotor 5 is able to rotate, and the one-way clutch 8—10—14 unlocks. In this second speed ratio range of drive, the radially bladed rotor 6 acts as a coupling rotor with respect to the radially bladed impeller 4, at coupling efficiencies upward of 90 percent, while rotor 5 is free to assume a speed at which its blades 55 provide a minimum of interference to flow. The floating blades 56a during this phase, lie as shown in Fig. 2, in coupling position. It is thought novel to have a rotor which in one driving phase may act as a forwardly rotating reaction wheel, and in a second phase, may act as a coupling rotor, in the above described manner.

In providing the preceding numerical example of selected ratio values, the purpose is to illustrate specifically how the invention operates, and the analysis is only to illustrate the teaching, rather than to be restricted by the example data in any way, for application of the teaching.

In utilizing the teaching, one may have driven rotors of differing torque capacities for different relative speed ranges, and the dimensions of the gears of the compound train may be selected in accordance with the teaching herein, as required by the power, load and speed requirements for the vehicle and its power plant.

The impeller 4 has straight radial vanes 54 and also the second turbine rotor, whereas the first turbine rotor has its vanes 55, curved as shown in Figs. 2 and 3.

With respect to operation, under initial drive, the rotor 5 is driven from standstill to a speed higher than that of the impeller 4, the load shaft 50 being driven in low range at maximum reduction by the gear train. Rise of load shaft speed permits the second turbine 6 to be driven by the fluid emerging from the first turbine rotor 5, and the latter rotor, under increased engine speed of the impeller 4 may then drive the vehicle at about 35 M. P. H., through the 1.53 to 1 second range gear train with carrier 18 as the sole input driver, with no torque coming from the first rotor 5. Under the latter condition, the rotor 5 because of its blading, and of the lowered circulating velocity of the fluid body of the working space, is free to assume a spinning speed at which the 1-way clutch 8—14—10 is released by the overspeed component applied to the sun gear shaft.

Under overtaking torque, in reduction drive, with brake 28 applied, there is available at all times a degree of engine braking couple afforded by the train. This is an obscure and difficult point to grasp, since one might first think that the freewheel clutch 8—10—14 would come into play under overrun conditions, and release the drive.

However, as explained above in connection with the downhill braking effect description, under overtaking torque, with brake 27—28 applied, the input members of the gear train; namely, shafts 11 and 15, are attempted to be driven at differing overspeeds, but with the sun gear shaft 11 released from rotor 5 by the one-way clutch 8—10—14. Shaft 15 is still coupled to the circulating fluid body through rotor 6 and by reference to Fig. 3, it will be seen that when these circumstances arise, the rotor 6 acting as an impeller will tend to drive the rotor 5 faster, the latter will spin forward out of the way, and the fluid stream emerging from the rotor 6 will be thrown out at an increased fluid velocity by its angular blading; hence there will be a tendency to drive rotor 4 as a power-receiving turbine. Such a useful result is not normally experienced in the fluid coupling art.

Therefore during low or second range drive, it is not possible to obtain a free-wheeling or coasting effect through the release of the 1-way clutch 8—14—10, when the rotor 6 is rotating with sufficient speed to become an impeller, since it provides a coupling action more effective than that of the common fluid flywheel, and therefore, a useful degree of engine braking is available in the reduction drive range, adding to the safety factors for drivers in hilly country.

In the form described herein, the transmission is capable of providing a smooth gradual change of ratio from 3.5 to 1 to 1.53 to 1, for example, in all of the vehicle speeds up to about 65 miles per hour, at which the direct drive clutch 57—65 may be engaged and the reduction drive reaction mechanism released. This shift would be made under normal drive conditions between 18 and 30 miles per hour, at the driver's choice.

Additional operation description is not believed needed, since the various other features of the invention have been described separately above in conjunction with the figure descriptions.

In reviewing the advantages and useful results, it is believed clearly understood from the foregoing description that the transmission drive assembly of the invention provides exceptional drive characteristics not found in other devices in this field. In its forward low drive range it provides multiplied torque derived from the fluid turbine device and from the gear train. It negotiates the transition from forward low to second range automatically as a result of the turbine and gear train characteristics, and provides coupled drive in the turbine device with the torque multiplication of the gear train in the second reduction range, and it provides a coordinated transition between direct and the reduction ranges in which the existing torque and torque reaction forces control the timing of the shift and provide a self-regulated smoothness which in actual road test of the invention, is believed exceptional.

This invention combination feature of a fluid turbine device and gear train is believed to embody operational results not available in other devices in this field, in particular the drive resultants displayed in Fig. 4. It embodies a particular placement of plural driven rotors in a fluid torque converter device which enables the device to assume an efficient coupling torque during second speed range. It embodies a safety brake for downhill drive, wherein the brake energy is conveniently extracted from the fluid working body and is not expended in wear of friction surfaces. It includes a special form of floating blade for one of the driven motors which enables that rotor to act as a reaction wheel in one phase of operation, and to act as a coupling rotor in a second phase, for drive in second ratio range.

Further useful results obtain in the compact size and form of the invention, making it applicable to vehicle installations where space is at a premium, and the lower floors of modern passenger cars are demanded by the user. These considerations are illustrated in the drawings of the construction of the present demonstration herein, made from structures actually built and operated successfully under rigid test for many thousands of miles.

It is to be understood that under the patent statutes, the applicant herein is entitled to describe and claim his invention in terms not specifically limited to the exact constructions shown in the pictorial demonstration or stated in the written description thereof, and that one skilled in the art may devise analogous constructions embodying the new teachings of this disclosure, with many and sundry variations, without departing from the spirit or principles of the invention, and therefore I do not intend the invention to be circumscribed in scope in any way other than set forth in the appended claims, wherein I claim:

1. In a combined fluid turbine and gear train drive having an engine and a load shaft, a fluid turbine device including plural driven rotors connected to plural input gear train elements of a gear train, said fluid turbine device enclosing a circulating fluid body and including an impeller, a first driven rotor and a second rotor arranged for relative rotation in the stated circulation sequence, said impeller and said rotors having a continuous circulation path for said fluid body in which the fluid emerging from said second rotor directly enters the inlet portion of said impeller, radial blading for said impeller and second rotor and blading for said first rotor with blades having a section of a curvature such as to cause it to rotate forwardly faster than the impeller, a planetary gear train of the compound-unit type connected to drive said load shaft with a pair of primary input elements operatively connected to the said first rotor to be driven thereby, and a secondary input element operatively connected to said second rotor to be driven thereby, a one-way locking clutch in the connection of said first rotor with its input elements operable to cause the rotor to drive the primary input elements during one drive interval, when said primary input elements are effective to drive, and operative to permit the primary input elements to run faster than the first rotor during a second drive interval when said secondary input element is driven by said second rotor, and a compound driven member connected to said load shaft, and consisting of a pair of driven elements each operative to receive torque generated by rotation of both of said driven rotors.

2. The combination set forth in claim 1, which includes a reaction element of said planetary gear train operative to establish low-gear drive of said load shaft by providing torque reaction for the drive of said primary and secondary elements, a brake member for said reaction element and movable drive-establishing control for the said brake member operative to maintain the drive of said elements during both said drive intervals, and also operable to interrupt said delivery.

3. The combination set forth in claim 1, including gear and planetary gear-carrying elements of said gear train connected to transmit the torques of said rotors and said input elements to said load shaft, a reaction element for said train, a controlled drive-establishing mechanism including a brake for said reaction member operable to establish or interrupt the said torques, and a set of auxiliary pivoted blades mounted to respond to the flow of said body of fluid from the exit of said first rotor to the inlet of the radial blades of the second rotor, said pivoted blades being operative to redirect the flow of said body passing thru the blading of said second rotor.

4. The combination as set forth in claim 1, including gear and planetary gear-carrying elements included in said gear train connected to transmit the torques of said rotors and said input elements to said load shaft, a reaction-sustaining element of said train, a brake mechanism operable to stop said reaction element, a controllable mechanism including said brake for establishing or interrupting the said torques, a clutch engageable by operation of said mechanism to connect said engine with said load shaft, and a control operative to cause said clutch to engage during a drive interval when said mechanism for said mechanism is operating to cause said mechanism to interrupt the said torques.

5. The combination set forth in claim 1, together with gear and planetary gear-carrying elements included in said gear train connected to transmit the torques of said rotors and said input elements to said load shaft, a reaction sustaining element of said train, a brake for stopping rotation of said element, a controllable mechanism operable upon said brake for establishing or interrupting said torques, a friction clutch adapted to connect said engine to the said load shaft, and a control operative upon the said clutch and said mechanism effective in one setting range to alternate their actuation, and in another to hold the mechanism active to establish the said torques while requiring said clutch to connect the engine with the load shaft, the said second setting having the useful result of causing the said second rotor to act as a dynamic braking impeller of the fluid body and thereby apply a braking force to the said load shaft additional to the engine braking afforded by the said friction clutch.

6. In variable speed drive mechanism for connecting an engine to a driven shaft of a vehicle, a fluid turbine drive device having an impeller driven by said engine and two torque-transmitting rotors bladed to form a toroidal working space for a circulating body, a compound gear train embodying a plurality of torque multiplying paths for driving said driven shaft, and having one input member connected to one of said rotors by a one-way clutch and another input member of said train connected to the other of said rotors, blading on the first of said rotors arranged to cause it to be rotated forwardly faster than the impeller and said second rotor during a primary torque-transmitting interval, and a set of movable flow-directing blades mounted to float in the flow inlet zone of the second of the said rotors and operative during said interval to redirect the flow of fluid passing thru the second rotor, said movable blades being mounted so as to provide a fluid coupling torque relationship between said impeller and said second rotor when said second rotor transmits substantially the entire torque from said impeller.

7. The combination set forth in claim 6, including a drive-establishing member for said train consisting of a reaction gear element operative by braking for causing the train to apply the torques of said input members to drive the said driven shaft, and including a fixed ratio gear coupling within said train effective to cause said second rotor to rotate forward during said interval and thereby cause the said second rotor to act as a forwardly-rotating reaction-supporting member and a control brake for said reaction element effective to stop its rotation and thereby apply the said torques to drive the said driven shaft.

8. The combination set forth in claim 6, including a drive-establishing reaction-supporting member for said train operative to interrupt the torque connection of said paths or to establish them for forward reduction drive of said driven shaft, a direct drive clutch engageable to connect said engine and driven shaft, and apparatus including a brake for said reaction member effective to provide common control of said drive-establishing member and said direct drive clutch for alternate operation thereof, and also arranged for simultaneous operation thereof, the result under overtaking torque of said driven shaft of causing said second rotor to spin as a dynamic braking impeller for the vehicle when said control provides such simultaneous operation and actuation thereof.

9. The combination set forth in claim 8, together with a one-way clutch located in the drive connection of said first rotor with its drive-transmitting element operative to permit the element to overspeed the rotor, and a set of pivoted flow-directing blades located in the inlet zone of said second rotor, operative to abut the adjacent radial blades of said second rotor during said interval for redirecting the stream flow of said fluid body passing thru said second rotor and further to permit said second rotor to accept a coupling torque from said fluid stream during a second interval when said one-way clutch may be effective to release the said first rotor from its driven drive-transmitting element, during which second interval said pivoted blades may abut said second rotor radial blades at a flat coupling angle.

10. A combined fluid turbine and compound planetary gear train drive assembly comprising a drive shaft, a driven shaft, a turbine device including a fluid impeller connected to said drive shaft, a first turbine rotor, a second turbine rotor, arranged in closed flow circuit sequence a fluid body circulating in said device and in said sequence, a planetary gear unit including a gear carrier connected to rotate with said second rotor, planet gearing mounted on said gear carrier, an annulus gear meshing with said planet gearing and connected to said driven shaft, a sun gear meshing with said planet gearing and connected for rotation by said first rotor; and a 1-way clutch operative to transmit the torque of said first rotor to said sun gear during a drive interval when both of said rotors are rotating forwardly at differential speeds with said first rotor rotating faster than said second rotor or said impeller, which interval occurs because the said sungear is driven faster than the said carrier by the stated connections.

11. The combination set forth in claim 10, including blading on said rotors and said impeller and wherein said impeller and said second rotor are equipped with flat radial blades and said first rotor blades are cupped to provide a forward torque on said first rotor from said circulating fluid body during said interval.

12. The combination set forth in claim 10, including blading on said impeller and rotors and wherein said impeller and second rotor are equipped with fixed radial blades, said first rotor blades being cupped to extract forward torque from said fluid body during said interval, and a set of flat, floating blades pivoted in the inlet portion of said second rotor, said pivoted blades being operative to abut the adjacent fixed radial blades at an angle during said interval.

13. The combination set forth in claim 10, including a friction clutch located in the connection of said second rotor with the said planet gear carrier, and control mechanism for said friction clutch effective to disengage the clutch for providing a drive interval in which no torque is delivered from either of the rotors thru said gear train to said driven shaft.

14. The combination set forth in claim 10, including a controllable friction clutch located in the connection of said second rotor with the said first planet gear carrier, a brake drum attached to said carrier, braking mechanism for said drum, and controls for said clutch and said mechanism operative for engaging and disengaging said clutch, and also operative for stopping the drum of said carrier to provide reverse rotation of said annulus gear resulting from torque delivered to said sun gear.

15. The combination set forth in claim 10, including a second planetary gear unit having a sun gear rotating with the sun gear of the first gear unit, a carrier rotating with the annulus gear of the first unit and supporting planet gears meshing with said second unit sun gear, said carrier being connected to said driven shaft, an annulus gear meshing with the said last-named planet gears, and controllable brake mechanism operative to stop the rotation of said annulus gear for providing gear-multiplied torque to said first unit annulus gear and second unit carrier.

16. In a combined fluid turbine and gear train drive having plural driven rotors connected to plural input gear train elements, of a compound planetary gear unit the combination of a fluid turbine device including an impeller, a first rotor and a second rotor arranged for relative rotation, and in closed fluid circulation sequence, radial blading for said impeller and second rotor and blading for said first rotor having a relatively high degree of inlet to outlet flow angles so as to cause the said first rotor to rotate faster than said impeller, a planetary gear train connected to drive a load shaft and having a primary input gear element connected to said first rotor and having a secondary input element connected to said second rotor, a one-way locking clutch located in the connection of said primary gear element with the said first rotor operable to cause the rotor to drive the element but to release them when the primary gear element rotates forwardly faster than the said first rotor, and an operator-operable brake and a torque-reaction-sustaining element of said gear train held against rotation by said brake, the elements of said gear train being so interconnected that operation of said brake to hold said torque-reaction-sustaining element against rotation compels reduction drive by said train of said load shaft during drive by either of said rotors.

17. A combined fluid turbine drive device and gear mechanism arranged to connect a driving and a driven shaft, a plurality of rotors constituting the device, the said rotors being formed and bladed to provide a toroidal circulation space for a torque-transmitting fluid body, and having a compound planetary gear consisting of two planetary units each having meshing sun, planet, and annulus gears, a carrier for the planet gears, an impeller rotor driven by said driving shaft and arranged to deliver said fluid body to a second of said rotors, and a third rotor arranged to receive said fluid from said second rotor and re-circulate same to said impeller rotor, a shaft connecting said second rotor to both of the sun gears of said units, a shaft connecting the third of said rotors to the carrier of the first of said units, a connection between the annulus gear of said first unit and the carrier of said second unit, a connection between said second unit carrier and the said driven shaft, braking means for stopping rotation of the annulus gear of said second unit for establishing torque reaction effective to provide two ranges of forward variable speed drive between said shafts, a 1-way clutch for permitting said sun gear shaft to rotate faster than said second rotor, a separate clutch operative to disconnect said third rotor shaft from said first unit carrier for establishing neutral, or operative to connect them for providing drive between said shafts, and a control for said braking means and said separate clutch effective under one setting of said control to require connection of said clutch while said braking means is operative to stop said annulus gear.

18. A fluid turbine drive device arranged to transmit torque from a driving shaft to a driven shaft through a torque-combining, planetary gear mechanism which has two power-input elements, and includes two driven elements, said device consisting of an impeller, a first torque-transmitting rotor and a second torque-transmitting rotor having fixed blading to form a toroidal working space for a fluid body, an arrangement of blades in said working space in which the impeller blades occupy the outflow zone of said space, the first rotor blades lying in the outer radial zone of the space and in which the second rotor blades lie in the inflow zone of the space, the bladed portions of the impeller and rotors encompassing an continuous flow circuit the said first rotor blades having a predetermined inlet-to-exit curvature with respect to the outflow from said impeller such that the first rotor is impelled to rotate forwardly faster than the impeller, a shaft connecting said second rotor to one of said power-input elements, and a one-way clutch arranged to connect said first rotor to said other power-input element operative to transmit initial drive torque from the said driving shaft to said planetary gear mechanism and operative to interrupt the connection of the first rotor to its element when said second rotor is transmitting torque to its connected element, said planetary gear mechanism being operable to provide reduction ratio drive of said output shaft during transmission of torque by either of said rotors.

19. The combination set forth in claim 18, which includes a set of pivoted blades located in the flow inlet portion of said second rotor and operative to abut the adjacent edges of the second rotor fixed blades at a predetermined angle to provide flow redirection to said body.

20. The combination set forth in claim 18, which includes a set of pivoted blades located in the flow inlet portion of said second rotor operative to abut the adjacent ends of the trailing second-rotor fixed blades at a predetermined angle to provide flow redirection to said body, and further operative to abut the adjacent ends of the leading second-rotor fixed blades at a flat angle during coupling drive by said second rotor of its connected element.

21. The combination set forth in claim 18, which includes a set of pivoted blades located in the flow inlet portion of said second rotor and operative to swing freely between stop positions, in one of which positions the pivoted blades act to redirect the flow of the fluid body and in the other of which positions they lie at a flat angle with respect to the adjacent fixed blades of the second rotor.

22. The combination set forth in claim 18, which includes said torque-combining mechanism embodying mutually reactive gear-train elements each connected to one of the said power-input elements and each effective to provide a forward drive torque to the mechanism for driving a load shaft forwardly and a brakable reaction member for said planetary gear mechanism operative to establish said forward drive torque when braked.

23. The combination set forth in claim 18, wherein said mechanism includes mutually reactive gear train elements each driven by one of said power-input elements and operative to provide separate forward torques to said planetary torque-combining mechanism, a reaction gear element of said train, a brake for said reaction gear element, a load shaft variable driven by said mechanism, and of a controllable drive-establishing mechanism including an operator for said brake effective to provide multiplied torque drive of said load shaft.

24. In power converting drive assemblies, an engine, a driven shaft, a fluid turbine device including multiple rotors and having an impeller driven by said engine, a torque-multiplying planetary gear train having two power input elements and an output element connected to said shaft, a reaction gear element of said train, a brake for stopping rotation of said reaction element, a first rotor of said device receiving the outflow of said impeller and bladed to rotate forwardly faster than the impeller, a one-way clutch connecting said rotor to one of said input elements, a second rotor receiving the outflow of said first rotor and directing the circulating fluid to the inlet of said impeller, a shaft connecting said second rotor to the other of said input elements, and pivoted blading located in the inlet of said second rotor adapted to provide re-direction to the flow of fluid delivered to said impeller when said clutch is locked, and said brake is applied and adapted to provide fluid coupling to the other of said elements when said clutch is released and said brake remains applied.

25. The combination set forth in claim 24, including controllable torque-multiplication mechanism in said gear train including said reaction element and said brake, operative to establish the drive of said driven shaft from the torques delivered by said rotors to said input elements and operative to provide said torque muliplication drive also during the interval when the said clutch is locked and during the interval when it is released.

26. A variable speed ratio drive assembly adapted to connect an engine shaft to a driven shaft, comprising a fluid turbine drive device including an impeller driven by said engine shaft and having two output rotors geared to rotate at differential speeds with respect to each other, a bladed fluid working space enclosed by the bladed portions of said impeller and rotors, said space accommodating a circulating fluid body, a compound planetary gear train having a compound output member adapted to drive the driven shaft, said train having two input members, each arranged to be driven by one of said rotors and the arrangement providing two separate torque ratios of drive within said train for driving said driven shaft forwardly at different torque multiplication ranges, a reaction gear element of said train effective to provide torque reaction for multiplied torque drive by said compound member of said driven shaft during drive of either of said input members by its connected rotor, brake mechanism operable to stop the rotation of said reaction element, curved vanes mounted on the first one of said rotors effective to cause it to rotate forwardly faster than said impeller, and movable vanes mounted on the second one of said rotors operative when said first rotor drives its input member of said train to provide a fluid re-directing force to the circulating fluid flowing from the exit of said second rotor to the inlet of said impeller.

27. The combination set forth in claim 26, which includes a one-way clutch coupling one of said rotors to one of said input members, said reaction element and said stated vane arrangement of said rotors providing a multiplied torque drive of said driven shaft derived from said first rotor and said one-way clutch coupling and derived from the gear train by the reaction effect provided when said brake mechanism is operable to stop rotation of said reaction element.

28. The combination set forth in claim 26, which includes a direct drive clutch for said shafts, actuating mechanism for said clutch, a common control for said brake and clutch mechanism and coordinating means for regulating the torque delivered by said clutch and the torque reaction effect of said brake mechanism controlled by said common control.

29. The combination set forth in claim 26, which includes a direct drive clutch for said shifts, fluid pressure actuation mechanism for holding said clutch engaged, a fluid pressure supply, a fluid pressure actuator for said brake mechanism, and control valving for directing fluid pressure from said supply to said clutch holding mechanism and said brake actuator and operative to cause clutch engagement with brake release, brake engagement with clutch release, and to establish actuation of both said clutch and said brake, in various valving settings.

30. The combination set forth in claim 26, which includes a direct drive clutch operable to connect said shafts and controls for said brake mechanism and said clutch effective to alternate their actuation for establishing forward reduction or direct drive, and further operative to actuate them simultaneously so as to cause one of said rotors to rotate at an increased speed with respect to said shafts and thereby impel said fluid body in said working space for providing a fluid braking action on the output element of the said train.

31. A power drive assembly including a compound planetary gear train arranged to connect driving and driven shafts at variable speed ratios, a fluid turbine device embodying a plurality of bladed rotors forming a toroidal fluid working space for a circulating body of fluid, one of said rotors being an impeller, a pair of said rotors adapted to deliver variable torques and differentially gear coupled to separate input elements of said gear train, a compound member of said train connected to said driven shaft, said input elements being so geared to drive said compound member as to drive said compound member and said driven shaft at different reduction ratios during drive of said input elements by the rotors coupled thereto, a one-way clutch adapted to permit the first one of said pair of rotors to run slower than the one of the said gear train input elements to which it is coupled, or to lock to said elements, the blades on the other of said rotors consisting of a first set of pivoted blades receiving the flow of said fluid body from said impeller and a second set of fixed blades receiving the said flow from said pivoted blades and directing same to the inlet space of said impeller, the said pivoted blades being operative to abut the adjacent ends of said fixed blades at a predetermined angle for providing re-direction to said fluid body.

32. The combination set forth in claim 31, in which said pivoted blades are likewise arranged to abut adjacent ends of said fixed blades at a flat angle.

33. The combination set forth in claim 31, in which a forward drive-establishing gear reaction element is provided to cause reduction drive of said driven shaft and to multiply the torques delivered to said input elements by said pair of rotors, and a brake effective to stop the rotation of said reaction element during the drive interval when said one-way clutch is permitting said first rotor to run free or to remain locked to its corresponding gear train input element.

34. The combination set forth in claim 31, which includes a planetary reaction member for establishing reduction reverse drive of said driven shaft, said member being attached to the second of said gear train input members which is coupled to said second rotor of said pair.

35. A power drive assembly arranged to provide two forward reduction ratio ranges for driving an output shaft, and driven by an engine, said assembly consisting of a first and a second planetary gear unit each composed of sun, planet and annulus gears, the planet gear carrier of said first unit being a power input member and the carrier of said second unit being a power output member and connected to the annulus gear of said first unit, a second power input member connected to both said sun gears, brake mechanism for said second unit annulus gear, and a fluid turbine device having an impeller connected to said engine and two driven rotors respectively connected to said gear unit input members, an automatically operating clutch effective to permit said sun gear connected input member to rotate faster than the driven rotor to which it is connected, the combination of said device and said units providing two stages of torque multiplication forward drive of said output shaft when said brake mechanism holds said second unit annulus gear from rotating one of said stages occurring when the first of said rotors drives said sun gears through the locking of said clutch.

36. The combination set forth in claim 35, including a fluid pressure supply, a fluid-pressure actuated clutch adapted to couple the engine directly to said output shaft, a fluid pressure actuator for said mechanism, a fluid pressure compartment in said actuator adapted to be connected to said supply, and including valving for delivering pressure from said supply to said clutch and to said compartment for preventing actuation of said brake mechanism when said fluid pressure actuated clutch is engaged.

37. In a variable torque power transmission assembly, the combination of a fluid turbine device including a workink space for a toroidally circulating body of fluid and having an impeller, a first rotor having curved blades and receiving the fluid flow from said impeller, a radially bladed second rotor receiving the flow from said first rotor and delivering same directly to the inlet of said impeller, a planetary gear train having a power output member connected to said driven shaft, and having one power input member connected to said second rotor and a second power input member coupled to said first rotor, a brakable reaction member of said train effective to provide reduction gear drive of said power output member when braked, a gear coupling arrangement including said gear train power input members and including an element adapted to drive said power output member reversely, and a reaction locking mechanism for the first named power input member also operative to stop rotation of said second rotor and thru said gear coupling arrangement operative to cause said element to drive the power output member reversely.

38. The combination set forth in claim 37, which includes a one-way clutch in the connection of said first rotor with its power input member of said train operative to permit the said rotor to move faster than but not slower than the said member, and a friction clutch in the connection of said second rotor with its power input member, operable to be disengaged and thereby prevent spinning rotation of the elements of said train when both of said reaction members are inactive.

39. In variable torque power transmissions for connecting an engine and a driven shaft, the combination of a drive-transmitting planetary mechanism for said driven shaft having two input power connections, a fluid turbine device having a bladed impeller driven by said engine and two bladed rotors each connected to one of said input power connections, the bladed portions of said impeller and rotors forming a continuous closed flow circuit and said rotors being rotatable at differential speeds while operable to deliver variable torques to said connections, a circulating fluid body occupying the working space circuit formed by bladed portions of said impeller and rotors and said body circulating therein over a range of circumferential flow velocities, a set of floating blades pivoted in the inlet space of second rotor operative to occupy angular positions for providing a fluid redirecting effect to said body during one predetermined velocity period of the fluid body, and operative to occupy radial planar positions during a second predetermined velocity period, a reaction gear element for said planetary gear mechanism, and a selectively operable brake for said reaction element operative to stop same during a drive interval when said floating blades are providing the said fluid redirecting effect to said fluid body.

40. A variable torque drive mechanism for driving a driven shaft from an engine embodying a compound planetary gear train having multiple input torque paths and effective to deliver multiplied torque drive to said driven shaft and embodying two mutually reactive gear train input elements operative during one drive interval when forward driving power is applied to a first of said elements the second of said elements to revolve forwardly at a lesser speed than said first-named input element; a reaction torque-sustaining element of said train, a brake member operative to stop said last-named element or to release same for rotation, said reaction gear element providing reaction for said planetary gear mechanism during drive thereof by either of said rotors, a fluid turbine device consisting of an impeller rotor driven by said engine and a first and a second power-receiving rotor connected to drive said gear train input elements, said rotors being bladed to form a closed toroidal circulation space for a body of liquid, movable blading mounted on said second rotor operative to provide a redirecting effect to said circulating fluid body, a one-way clutch in the connection of said first gear train input element to said first rotor operative to disconnect them automatically when said first gear train input element is rotated faster than the speed of its rotor, and a driver operated control for said member operative to interrupt the paths of torque of said train, by releasing said brake or to establish forward reduction drive by applying said brake wherein initial drive provided by said impeller is transmitted thru said one-way clutch by said first rotor to its input train element at a torque multiplication, and wherein said brake remains applied a second drive interval results when said first train element overruns said first rotor to release the drive of said one-way clutch and said second rotor is driven with a fluid coupling effect to drive the said second train input element.

41. The combination set forth in claim 40, which includes a controllable friction clutch in the connection of said second rotor with its gear train input element, and control mechanism for said clutch and for said driver controlled member operable when the latter is interrupting the paths of torque of said train to require said friction clutch to be disengaged.

42. The combination set forth in claim 40, in which said movable blades are pivoted in the said second rotor in the direction of circulation preceding a set of fixed blades of said rotor and utilizing adjacent end portions of said fixed blades as stops permitting the movable blades to swing between acute angle and flat angle positions, so that in their acute angle positions the stated fluid stream redirecting effect is provided in the body of fluid passing thru the blades of the second rotor, and so that in their flat angle positions the fluid coupling effect of said second interval is augmented.

43. The combination set forth in claim 40, which includes a controllable clutch engageable to connect said engine and driven shaft, and a control arrangement for said clutch and said brake in which said driver controlled member is operative to establish said forward reduction drive and in which said clutch is also engaged, having the useful result of causing said second power-receiving rotor to act as a dynamic braking impeller operative to apply a braking force on said driven shaft during an overtaking torque period of said driven shaft.

44. In a drive train having driving and driven shafts and embodying a planetary gear unit having a power input gear element, a power output element, a reaction element, and having a clutch adapted to connect said driving and driven shafts, a non-rotating brake ring, a brakable member rotating with said reaction element and subject to axial movement for braking against said ring and thereby stopping rotation of the reaction element, a cylinder, a piston slidable in the cylinder to abut said member and apply said braking force, a pressure head space at one end of said cylinder and a pressure balancing space at the other end of the cylinder, an exhaust orifice arranged to vent simultaneously said clutch cylinder and said pressure balancing space, a pressure feed arrangement for said pressure head space operative to apply pressure thereto for causing said piston to exert said braking force upon said member, and a common control for exposing said orifice while delivering pressure to said pressure head space operative to reduce the torque capacity of said clutch while said piston is increasing the brake loading of said member.

45. The combination set forth in claim 44, in which said transmission elements are equipped with helical gear teeth operative under a torque applied to said power input gear element to generate an axial force upon said reaction element and brakable member in a direction to increase the braking force on said member after initial contact between said member and ring provided by travel of said piston.

46. The combination set forth in claim 44, which includes a first spring adapted to oppose the motion of said piston toward abutment with the said member and a second spring operatively located to first transmit the force of said piston to said member prior to said abutment, such that the initial loading force delivered to the member is limited to the thrust value capable of being transmitted by the said second spring.

47. The combination set forth in claim 44, in which said exhaust orifice provides a rate of pressure relief of said clutch cylinder and said pressure balancing space effective to control directly the diminishing of the clutch torque capacity simultaneously and proportionally with the permitted rise of brake reaction force provided by said piston under the pressure existing in said pressure head.

48. The combination set forth in claim 44, which includes control devices operative to relieve the pressure of said clutch cylinder and of said pressure-balancing space while brake actuator pressure is effective in said piston pressure head, and further operative to apply clutch loading pressure to said clutch cylinder while feeding pressure to said pressure-balancing space for restoring the pressure balance with respect to the pressure head space, and springs arranged to assist the motion of the piston to pressure-balanced position and operative to fully release the friction load of said member upon said ring at the completion of the brake-releasing travel of said piston.

49. In a variable torque drive for connecting an engine to a load shaft, a combined fluid turbine and gear drive assembly including a compound planetary gear train adapted to deliver multiplied torque to said load shaft, through a compound member said train having two torque-delivering input elements operative at differential forward speeds, a torque reaction-sustaining element of said train, a braking member for said last-named element, a fluid turbine device providing a closed toroidal working space for a circulating fluid body having an impeller, a first driven rotor connected to drive one of said elements, a second rotor arranged to receive the outflow of said first rotor and to direct same to the inlet of the impeller, said second rotor being operative to transmit a coupling torque to the other one of said input elements, a blading arrangement of said second rotor having a first set of blades pivoted in the inlet portion and a following set of blades adapted to cooperate with the first set for redirecting said flow under one torque condition and to cooperate therewith under another torque condition in which the second rotor delivers a forward coupling torque to its element of the train, said second rotor likewise being operative to act as a coupling impeller under overtaking forward torque of said load shaft, so as to provide effective engine braking, and a selective control for said brake operative to apply the said brake to said reaction element for establishing the said engine braking, said reaction-sustaining element providing reaction for said train during drive of either of said input elements.

50. A variable torque drive assembly including power and load shafts, and a planetary gear train for connecting said shafts with helical gearing arranged to transmit torque between said shafts, a brakable torque reaction member of said gear train subject to the thrust generated by said helical gearing, a brake element for said torque reaction member, brake release springs, a fluid pressure actuator for said brake element operative to oppose the force of said springs, a pressure actuation space for said actuator and a pressure balancing space for same, a clutch arranged to connect said shafts directly, a fluid pressure actuator for said clutch, a pressure actuation space for said clutch actuator, a fluid pressure control system for said pressure spaces operative to provide simultaneous pressure in said spaces permitting said springs to release said brake element and to apply said clutch actuator to hold said clutch engaged, and operative to release the pressure in said balancing and said clutch actuation spaces to permit the pressure of said brake actuator space to actuate said brake element.

51. The combination set forth in claim 50, which includes a lost motion connection between said brake element actuator and the member, and of a spring operative to deliver an initial loading force from the actuator to said spring to initiate the reaction force on said member prior to the application of braking thrust thereon by said helical gearing.

52. The combination set forth in claim 50, which includes coordinated means to control the rate of venting of said pressure of the pressure balancing space effective to cause said brake element to be applied gradually to said member.

53. In power-delivering drives, the combination of a fluid turbine, a torque-transmitting device with a working space for a circulating body of fluid operative to develop fluid-generated torques between an impeller and a first and a second rotor, a flow circuit in said working space which includes blading of the impeller operating to generate kinetic energy in the circulating fluid body and to impinge the fluid body on the blades of the adjacent first rotor, said latter blades having an angularity between inlet and exit angles sufficient to cause the first rotor to spin forwardly faster than the impeller, the combination including blading of said second rotor operating to redirect the said fluid body to the inlet of the said impeller, a planetary gear train having elements individually driven by said rotors, a reaction-sustaining element for said train brakable to establish drive of a power-receiving shaft, and a brake for said latter-named element effective when applied to establish torque reaction of said gear train and thereby regulate the relative rotation of said second rotor, the elements driven by said rotors being so related in said gear train that transmission of torque by said first rotor compels rotation of said second rotor in the same direction as said first rotor.

54. In power-delivering drives, the combination of a fluid turbine, torque-transmitting device with a working space for a circulating body of fluid operative to develop fluid-generated torques between an impeller and a first and second rotor, a flow circuit in said working space which includes blading of the impeller operating to generate kinetic energy in the fluid body and to impinge the fluid body on the blades of the adjacent first rotor, said latter blades having an angularity between inlet and exit angles sufficient to cause the first rotor to spin forwardly faster than the impeller, and includes blading of said second rotor operative to redirect the fluid body to the inlet of the impeller, a power-receiving shaft, a one-way clutch operative to connect and disconnect the latter shaft to and from said first rotor, rotation controlling mechanism operative upon said second rotor to vary the redirection action of the said second rotor blading upon the body of circulating fluid, and a gear train driven by said shaft and operative to drive a load shaft at multiplied torque derived from said first rotor and said train.

55. In power-delivering drives, the combination of a fluid turbine, torque-transmitting device with a working space for a circulating body of fluid operative to develop fluid-generated torques between an impeller and a first and second rotor, a flow circuit in said working space which includes blading of the impeller operating to generate kinetic energy in the fluid body and to impinge the fluid body on the blades of the adjacent first rotor, said latter blades having an angularity between inlet and exit angles sufficient to cause the first rotor to spin forwardly faster than the impeller, and includes blading of said second rotor operative to redirect the fluid body to the inlet of the impeller, a power-receiving shaft, a one-way clutch operative to connect and disconnect the shaft to and from said first rotor, a gear train driven by said shaft and operative to drive a load shaft, a rotation-controlling mechanism for said second rotor adapted to vary the fluid redirecting action of the second rotor, and a member driven by said gear train and effective to apply rotation-controlling force to said member.

56. In variable torque ratio drive mechanisms for vehicles the combination with an engine and a driven shaft of a fluid turbine device embodying an ampeller member driven by said engine, a first rotor member and a second rotor member arranged to circulate fluid in the stated sequence; blading on said members shrouded to form a continuous circulation working space for a body of fluid, the blading of said impeller lying radially in the radial outflow zone of said space, the blading of said second rotor lying radially in the radial inflow zone of said space, and the blading of said first rotor located in the outer radial zone of said space so as to receive the outflow of said impeller member and to deliver the flow to the said second rotor, said first rotor blading being curved so as to cause the first rotor to spin forwardly faster than the impeller or said second rotor during a given forward drive interval, and a planetary gear train including a plurality of drive-transmitting gear train elements arranged and connected to said rotors to deliver the torques provided by said rotors and to apply same to drive said driven shaft from said train through a connection from two driven elements thereof, said drive-transmitting elements being so geared together that drive transmitted to said gear train by said first rotor causes forward rotation of said second rotor during forward drive by said first rotor.

57. In a fluid turbine drive of the toroidal flow type including a plurality of bladed rotors associated to form a closed working space for a recirculating fluid body, so as to transmit variable torques between an engine and a load shaft, the combination of an engine-connected impeller bladed in the outflow zone of said space, a first driven rotor bladed in the outer radial zone thereof and a second driven rotor bladed in the inflow zone of the said space and adapted to re-direct the circulating fluid body directly to the inlet space of the impeller, a compound planetary gear train adapted to drive said driven shaft, a pair of driven elements of said train connected to said driven shaft, and two power input members of said train respectively connected to said driven rotors effective to transmit separate drive torques from said rotors rotating in the same direction, one of which input members delivers multiplied torque to said train, a forward drive reaction element for said gear train, and a brake for holding said reaction element against rotation during transmission of drive torque by said rotors when rotating in the same direction as said impeller.

58. In a fluid turbine drive mechanism of the toroidal flow type including a plurality of bladed rotors associated to form a closed working space for a recirculating fluid body for transmitting variable torques between driving and driven shafts, the combination of a driving impeller bladed in the outflow zone of said space, a first driven rotor bladed in the outer radial zone of said space, and a second driven rotor located in the inflow zone of said space arranged to re-direct the fluid body directly to the inlet space of the impeller, a compound planetary gear train adapted to drive said driven shaft, a connection between said driving shaft and the impeller, two input members of said train connected to said first and said second driven rotors, a compound driven member of said train connected to said driven shaft, respectively and operative to transmit separate drive torque from said rotors rotating in the same direction, a forward drive gear reaction element of said train subject to braking force for establishing torque-multiplied forward drive of said driven shaft by said member, and controllable braking mechanism for said reaction element operable to provide such drive during periods of said separate drive torques applied to said gear train input elements when said rotors are rotating in the same direction as said impeller.

References Cited in the file of this patent

UNITED STATES PATENTS

| | | |
|---|---|---|
| 1,855,967 | Jandasek | Jan. 17, 1932 |
| 1,960,705 | Kochling | May 29, 1934 |
| 2,144,596 | Daiber | Jan. 17, 1939 |
| 2,156,493 | Durrell | May 2, 1939 |
| 2,162,803 | England | June 20, 1939 |
| 2,203,177 | Patterson | June 4, 1940 |
| 2,260,015 | Eichtner | Oct. 21, 1941 |
| 2,280,015 | Tipton | Apr. 14, 1942 |
| 2,291,120 | Tipton | July 28, 1942 |
| 2,312,849 | Pollard | Mar. 2, 1943 |
| 2,316,390 | Biermann | Apr. 13, 1943 |
| 2,317,498 | Tipton | Apr. 27, 1943 |
| 2,346,365 | Duffield | Apr. 11, 1944 |
| 2,378,577 | Oldfield | June 19, 1945 |
| 2,456,328 | Schneider | Dec. 14, 1948 |
| 2,541,391 | Weiss et al. | Feb. 13, 1951 |